Patented Aug. 4, 1953

2,647,881

UNITED STATES PATENT OFFICE 2,647,881

THERMOSETTING ORGANOSILOXANE RESINOUS COMPOSITIONS AND METHODS OF CURING THEM WITH BETA-HYDROXYETHYLTRIMETHYL AMMONIUM BICARBONATE

Harold A. Clark, Midland, Mich., assignor to Dow Corning Corporation, Midland, Mich., a corporation of Michigan No Drawing. Application August 20, 1951,
Serial No. 242,785

2 Claims. (Cl. 260—46.5)

This invention relates to thermosetting siloxane resinous compositions.

Various catalysts have been employed for accelerating the cure of organosiloxane resins. These materials include alkali metal hydroxides, acids, salts of carboxylic acids, and quaternary ammonium hydroxides and quaternary ammonium alkoxides. All of these materials promote the cure of siloxane resins but they each suffer from disadvantages when employed in the commercial fabrication of molded articles. In the case of the alkali metal hydroxides, quaternary ammonium hydroxides and acids, the catalysts are so powerful that it is difficult, or at times impossible to obtain useful molded articles because the siloxanes resins will set prematurely. In the case of the metal-containing catalyst, there is a disadvantage that a metallic residue remains which is still active after the siloxane resin has thermoset. This active residue promotes the deterioration of the set resin when subject to elevated temperatures. Such deterioration is detrimental since siloxane resins are normally employed for high temperature uses.

The heretofore employed quaternary ammonium alkoxides or acyloxy compounds do not leave a residue but they require appreciable amounts of a catalyst and are comparatively slow in the setting of the resins.

The applicant has found unexpectedly that as a catalyst for curing siloxane resins, beta-hydroxyethyltrimethylammoniumbicarbonate [$HOCH_2CH_2(CH_3)_3NHCO_3$] is from 10 to 20 times more powerful than the quaternary ammonium alkoxides and yet does not prematurely set the resins.

It is the object of the invention to provide a thermosetting composition which may be cured at maximum speed employing a minimum of catalyst. Another object of this invention is to provide a method for preparing superior molding compositions and laminates.

This invention relates to a composition of matter comprising a resinous organopolysiloxane having from 1 to 1.5 organic radicals per silicon atom, said organic radicals being of the group methyl and phenyl radicals and at least 50 per cent of said radicals being methyl, and beta-hydroxyethyltrimethylammoniumbicarbonate in amount of from .001 to .04 per cent by weight based upon the weight of the siloxane.

The catalyst employed in this invention is a commercially available material which is normally supplied in a 35 per cent aqueous solution. The catalyst may be dispersed in the siloxane resin by any suitable means. It has been found convenient to employ alcohols such as ethanol or isopropanol as the dispersing agent. This facilitates mixing of the catalyst in the resin, although the employment of the solvent is not essential inasmuch as the amount of catalyst necessary is so small that even the aqueous solution can be satisfactorily dispersed in the siloxane. The amount of catalyst employed is between .001 to .04 per cent by weight. If the amount exceeds .04 per cent, the resin sets so fast that it is not satisfactory for use in molding. In amounts below .001 per cent, the catalyst does not have an appreciable effect upon the setting time of the resin.

The action of the catalyst is accelerated by employing heat. Preferably the setting is carried out at a temperature from 100° C. to 500° C. until a non-tacky, hard material is obtained.

The siloxane resins employed herein are well known commercial materials and for the purpose of this invention the degree of substitution should be from 1 to 1.5 methyl and phenyl radicals per silicon atom. Thus, the siloxane resins may be composed of polymer units of the type $RSiO_{3/2}$ or a mixture of this type unit with $R_2SiO$. The resin may also contain limited amounts of $SiO_2$ units and $R_3SiO$ although substantial amounts of the latter two should be avoided. All of the organic radicals in the unit may be methyl or the resin may be a mixture of methyl siloxane and phenyl siloxane. When mixtures are employed, the amounts of phenyl radicals should not exceed 50 per cent of the total number of organic groups. Specific examples of siloxane resins which are operative in this invention are monomethylsiloxane, monophenylsiloxane, dimethylsiloxane, diphenylsiloxane and phenylmethylsiloxane.

It may be desirable to employ the siloxane in the form of a solution in which case hydrocarbon solvents such as toluene, benzene, petroleum ether, xylene and the like are preferred.

The thermosetting siloxanes of this invention are useful in the molding art. Siloxane resins with or without the catalyst may also be employed in the printing art. The resin may be used to impregnate paper matrices used in the printing industry in the casting of type material. The use of the resin in the paper from which the matrix is made results in a cleaner type casting which releases better from the matrix.

The following examples are illustrative only and are not to be construed as limiting the invention, the scope of which is properly delineated in the appended claims.

Example 1

Beta-hydroxyethyltrimethylammoniumbicarbonate was dispersed in isopropanol and the solution was added to a 50 per cent toluene solution of a siloxane resin composed of 85 mol per cent monomethylsiloxane and 15 mol per cent dimethylsiloxane. The catalyst was added in amount of .005 per cent by weight based on the weight of the siloxane. Upon heating at 175° C. the resin gelled in 25 seconds. The solvent evaporated during the heating period.

Example 2

The procedure of Example 1 was repeated except that the composition of the resin was 38 mol per cent monophenylsiloxane, 35 mol per cent monomethylsiloxane and 27 mol per cent dimethylsiloxane. Upon heating at 175° C. the gelled in 18 seconds.

Example 3

The procedure of Example 1 was repeated except that the composition of the siloxane resin was 65 mol per cent monomethylsiloxane and 35 mol per cent monophenylsiloxane. Upon heating at 175° C. the resin gelled in 17 seconds.

Example 4

The procedure of Example 1 was repeated except that the resin composition was 35 mol per cent phenylmethylsiloxane, 10 mol per cent dimethylsiloxane, 30 mol per cent monomethylsiloxane and 25 mol per cent monophenylsiloxane and the catalyst was employed in amount of .002 per cent by weight based on the weight of the siloxane. The resin gelled in 38 seconds at 175° C.

That which is claimed is:

1. A thermosetting resinous composition comprising an organopolysiloxane having from 1 to 1.5 organic radicals per silicon atom, said radicals being selected from the group consisting of methyl and phenyl radicals, at least 50 per cent of said radicals being methyl, and beta-hydroxyethyltrimethylammoniumbicarbonate in amount of from .001 to .04 per cent by weight based upon the weight of the siloxane.

2. The method of curing resinous polysiloxanes which comprises heating a mixture of an organopolysiloxane having from 1 to 1.5 organic radicals per silicon atom, said radicals being selected from the group consisting of methyl and phenyl radicals, at least 50 per cent of the said radicals being methyl and beta-hydroxyethyltrimethylammoniumbicarbonate in amount of from .001 to .04 per cent by weight based on the weight of the siloxane, at a temperature of from 100° C. to 500° C. until a non-tacky, hard material is obtained.

HAROLD A. CLARK.

References Cited in the file of this patent

UNITED STATES PATENTS

| Number | Name | Date |
| --- | --- | --- |
| 2,518,160 | Mathes | Aug. 8, 1950 |